April 11, 1967  G. HEYS  3,313,030
HEIGHT MEASURING DEVICE
Filed Nov. 16, 1964
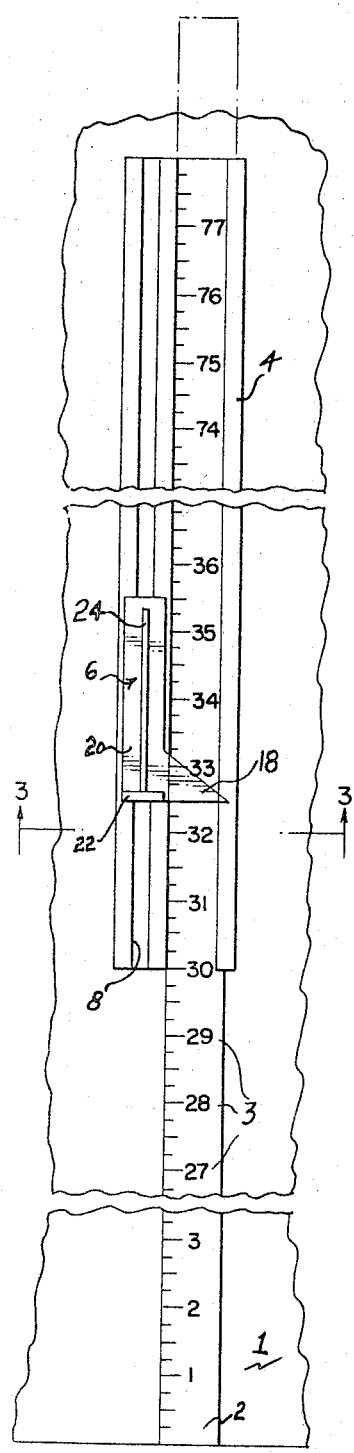
FIG.1
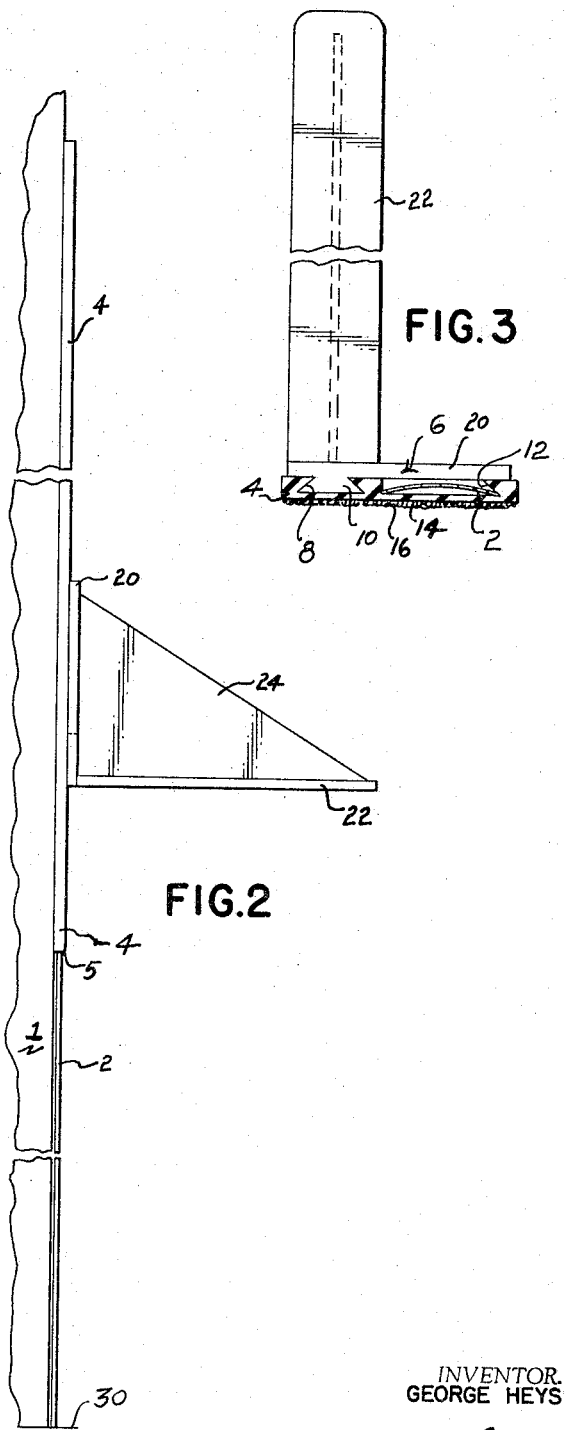
FIG.2
FIG.3
INVENTOR.
GEORGE HEYS
BY *Milton E. Gilbert*
HIS ATTORNEY

United States Patent Office 3,313,030
Patented Apr. 11, 1967

3,313,030
HEIGHT MEASURING DEVICE
George Heys, 120 N. Main St., Sidney, Ohio 45365
Filed Nov. 16, 1964, Ser. No. 411,229
5 Claims. (Cl. 33—169)

This invention is concerned with a height measuring device and is more particularly directed to a detachable and collapsible height measuring device.

Height measuring devices have been known wherein a vertically hanging base or scale is fastened in some manner to a wall, a door casing or similar support, and a horizontally extending measuring arm is associated therewith to cooperate with the scale in indicating height measurements. In most of such devices they must be permanently installed in their entirety or in part, or else the device must be re-measured from some datum line and reinstalled each time it is desired to take a measurement. Such devices are therefore objectionable in that they either require the permanent fastening of a portion thereof which may prove unsightly or a hazard to safety; or else such devices will require extensive reinstallation at fairly regular intervals, e.g. weekly, with attendant damage to walls or casings.

It is therefore one object of the invention to provide a height measuring device which is capable of accurately being reset each time it is intended to take a measurement but which does not require permanent fastening of any of its parts to the wall or other fixed portion of ones home. A further object of the invention is to provide a height measuring device which is portable and readily attached to and removed from a wall for measuring purposes. Still another object of the invention is to provide a height measuring device particularly adapted for home use which is rugged and durable in operation, relatively inexpensive to manufacture, and employs a minimum of parts requiring no special knowledge or training to install and operate. These and other objects will become more readily apparent upon a reading of the description following hereinafter, and upon an examination of the drawings, in which:

FIGURE 1 is a front view of the height measuring device of the invention installed on a fixed surface;

FIGURE 2 is a side view of the device of FIGURE 1; and

FIGURE 3 is a cross-sectional view taken along line 3—3 of FIGURE 1.

The height measuring device of the invention comprises in its preferred embodiment three main elements, i.e. a double track base member which is preferably elastic; a slidable height indicator and a flexible scale, the latter two elements being readily assembled to and detachable from the base member.

Referring now to FIGURE 1 it is seen that the height measuring device of the invention in its preferred embodiment comprises the double track base member 4 which has assembled to it the scale 2 and the height indicator 6. The tracked base member is affixed to the wall 1.

Considering for a moment the cross-sectional view of FIGURE 3 it is seen that the underside 14 of the tracked base member 4 is coated with an adhesive at 16 which preferably is of the type which permits repeated adhering to and removal from the wall 1. Such a plastic adhesive 16 would be provided with an adhesive protector strip which could be replaced each time the base member is removed from the wall 1. In this manner dirt will be prevented from adhering to and destroying the adhesive quality of the coating 16.

As shown in FIGURE 2 the bottom 5 of the base member 4 is located some distance from the floor 30, but such distance is not critical, and is dependent only upon the length of scale 2 that is available, and the approximate height of the object to be measured. It has been determined that a height of approximately thirty inches (as shown in FIGURE 1) is an optimum distance from the floor 30 to place the base 4.

As indicated previously the base member 4 is double tracked as at 8 and 12. The base is preferably made of a flexible plastic material or of rubber. The tracks are shown as dove-tail or inverted V-slots, although it is obvious that any shape for the slots can be employed. Thus, where a flexible steel scale is to be used, and as shown in FIGURE 3, the slot 12 to accept the scale 2 has one wall formed as a straight side and one wall as a portion of an inverted V-slot. This will provide a means for readily accepting, retaining and permitting the easy release of a steel scale. The relative dimensioning of the slot 12 vis-a-vis the width of the scale 2 is such as to provide a desirable amount of friction to retain the scale in position, yet also is insufficient to prevent sliding motion in the vertical direction to permit extension of the scale to the floor.

Slidably mounted yet frictionally held within the track 8 is the height indicator 6. This member is preferably made of clear plastic but it can be made of any material as desired. The indicator 6 comprises a bottom planar portion 20 which has a sideways extending pointer section 18 to cooperate with the scale in indicating height measurements. The indicator 6 slides within the track 8 of the base 2 because of the complementary dove-tail portion 10 formed on the underside of the bottom portion 20. Affixed to the portion 20 is the upstanding or outwardly extending (as viewed in FIGURE 2) arm 22 which is reinforced by the web section 24.

The method of installing the height measuring device of the invention will now be described. Firstly, the flexible base member 4 is unrolled and the plastic adhesive protector strip removed. Holding the base member with the groove 8 to the left as viewed in FIGURE 1, the base may be placed in a doorway adjacent the vertical surface of the jamb, or on any wall, adjacent any vertically extending surface, for guiding purposes. As indicated previously, the bottom 5 of the base 4 should be approximately 30 inches from the floor. Following this the flexible steel scale 2 having the indicia 3 thereon can be unrolled and snapped open to become rigid. Since such scales per se are not the subject matter of the invention it is sufficient to state that the nature of such steel scales is that when extended they remain flat, but if even the slightest pressure is applied to the central portion of the scale as viewed in cross-section in FIGURE 3, it will collapse and roll up. Therefore such scales exhibit a spring-like characteristic. This characteristic is availed of in the design of the slot 12 in the base 4, since as shown in FIGURE 3, although one side of the slot 12 is straight, the other side has a V-shape to prevent the unwanted rolling up of the scale when pressure is applied to its central area, while permitting sliding movement in a vertical direction of the scale within the groove 12. Because of the resistance to rolling up of the scale 2 provided by the groove or slot 12, the latter imposes a frictional restraint upon the scale to serve to retain it in position once it is vertically extended. In view of these properties the scale 2 can be extended and one end inserted into the bottom of the groove 12. Thereafter the scale 2 can be vertically slid upwards until the bottom of the scale rests upon the floor with the scale fully extended.

Next the plastic indicator 6 is inserted into the dovetail slot 8 from the top of the base 4 and is moved to any desired position along the base as required for measurement. Preferably the dimensioning of the portion 10 of the portion 20 is such as related to the groove 8 that a friction retention is provided which can be overcome only by direct application of force along the base portion 20 of the edge of the indicator 6 to move it along the track To effect a measurement with the device of the invention all that is needed is for the subject to place his or her heels against wall 1 and stand erect with the head touching the scale 2. The slide 6 is then moved until it just touches the persons head and because of the friction retention mentioned above, will remain in this position while the subject steps aside in order to enable reading the appropriate indicia 3.

Although I have described a preferred embodiment it is to be readily understood that many modifications can be made in various detail parts without departing from the spirit and scope of the invention as set forth in the appended claims.

What I claim is:

1. A height measuring apparatus repeatedly capable of readily being assembled and disassembled comprising, in combination:
    a flexible scale means capable of being rolled up for storage having height indicia thereon;
    a height indicator means having a portion thereof cooperating with said scale means for indicating a specific height measurement;
    and a resiliently flexible base member capable of being rolled up and removed from a fixed extended position, said base member being provided with a pair of tracks so proportioned as to releasably retain said scale means in one of said tracks and releasably retain said height indicator means in the other of said tracks.

2. The height measuring apparatus of claim 1 wherein the underside of said base member is provided with adhesive means enabling repeated attachment to and removal from a fixed surface with substantially no damage thereto.

3. The height measuring apparatus of claim 2 wherein said flexible scale member is so constructed and arranged as to be rigid and spring-like when assembled into one of the tracks of said base member, and is readily removable therefrom.

4. The height measuring apparatus of claim 1 wherein the track in said base member for releasably retaining said scale means is formed with a reentrant groove portion on one side of said track and a normal surface on the other side of said track.

5. The height measuring apparatus of claim 1 wherein said base member is devoid of indicia and may be randomly positioned with respect to said scale member without affecting the height measurement.

References Cited by the Examiner

UNITED STATES PATENTS

| 2,736,100 | 2/1956 | Landau | 33—169 |
| 3,190,008 | 6/1965 | Weiss | 33—161 |
| 3,196,548 | 7/1965 | Moore | 33—169 |

FOREIGN PATENTS

| 150,343 | 10/1931 | Switzerland. |

LEONARD FORMAN, *Primary Examiner.*

W. K. QUARLES, *Assistant Examiner.*